(12) United States Patent  (10) Patent No.: US 8,488,314 B1
Ashcraft et al.  (45) Date of Patent: Jul. 16, 2013

(54) VACUUM LATCH ASSEMBLY

(75) Inventors: Britt C Ashcraft, Tomball, TX (US);
Eric Chen, Houston, TX (US); Peter M On, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/456,099

(22) Filed: Apr. 25, 2012

(51) Int. Cl.
 *G06F 1/16* (2006.01)

(52) U.S. Cl.
 USPC ............ 361/679.58; 361/679.02; 361/679.26; 361/679.27; 312/223.1; 312/223.2

(58) Field of Classification Search
 USPC .................................... 361/679.58
 See application file for complete search history.

(56) References Cited

U.S. PATENT DOCUMENTS

| | | | |
|---|---|---|---|
| 6,859,364 | B2 | 2/2005 | Yuasa et al. |
| 8,199,496 | B2 * | 6/2012 | Liu et al. .................. 361/679.58 |
| 8,315,040 | B2 * | 11/2012 | Roberts et al. .......... 361/679.01 |
| 2011/0058316 | A1 | 3/2011 | Liu et al. |

FOREIGN PATENT DOCUMENTS

| | | |
|---|---|---|
| JP | 2004252741 | 9/2004 |
| WO | 2006080879 | 8/2006 |

OTHER PUBLICATIONS

Uotani, Frank. Truly Elite. Jan. 8, 2011. Apple MacBook Air MC505/A 11.6-Inch Laptop (Old Version) (Personal Computers). http://www.amazon.com/Apple-MacBook-MC505LL-11-6-Inch-VERSION/product-reviews/B0047DVRQW?pageNumber=2.

* cited by examiner

*Primary Examiner* — Anthony Q Edwards

(57) ABSTRACT

An example of an electronic device is disclosed herein that includes a housing and a lid joined to the housing and movable between a closed position adjacent the housing to define an enclosed space and an open position. The electronic device additionally includes a vacuum latch assembly to exhaust air in the enclosed space to create a substantially fluid-tight environment within the enclosed space and to help retain the lid in the closed position. Additional features and components of the electronic device and vacuum latch assembly are disclosed herein, as are other examples thereof.

17 Claims, 3 Drawing Sheets

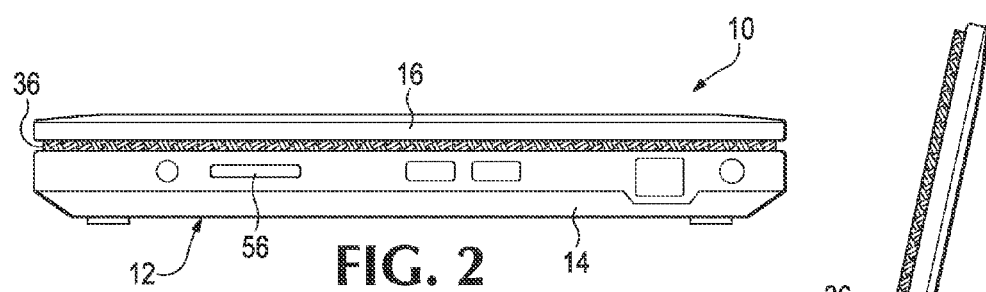
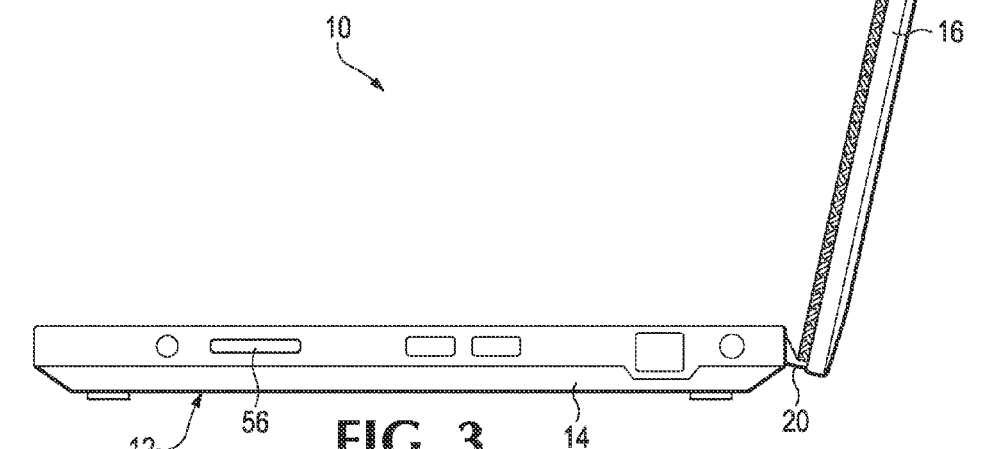
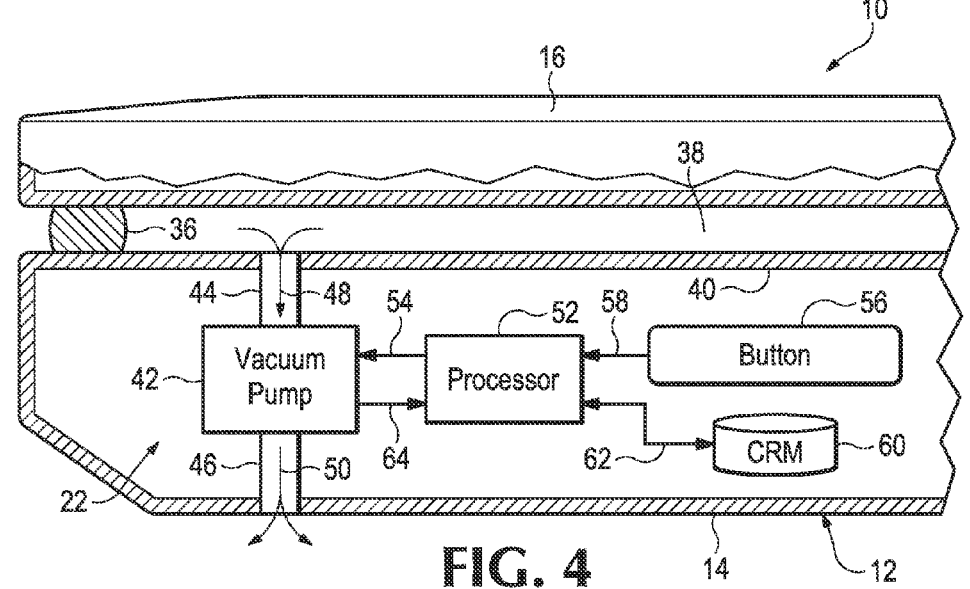

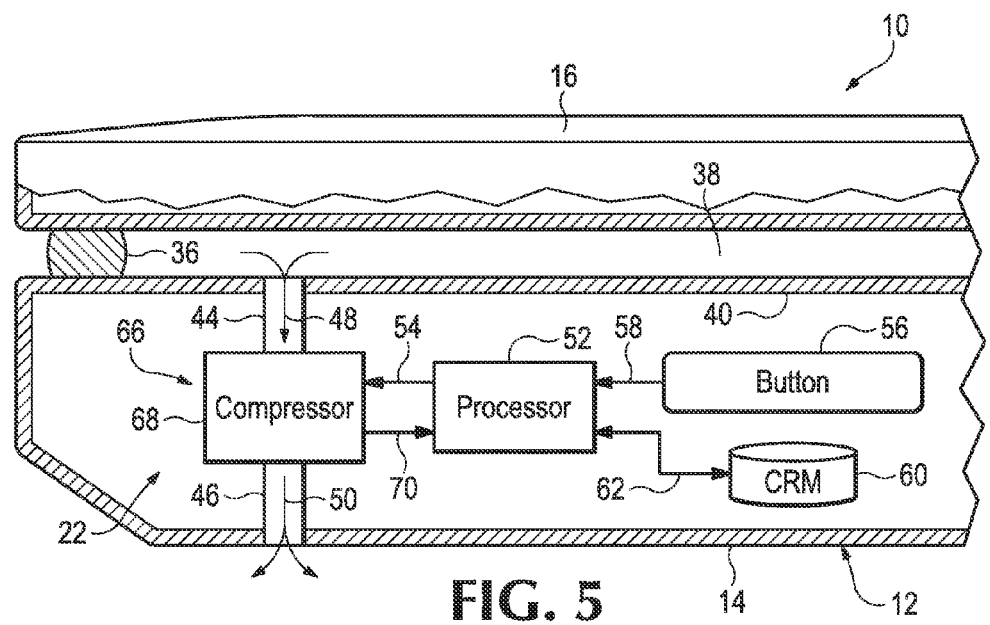
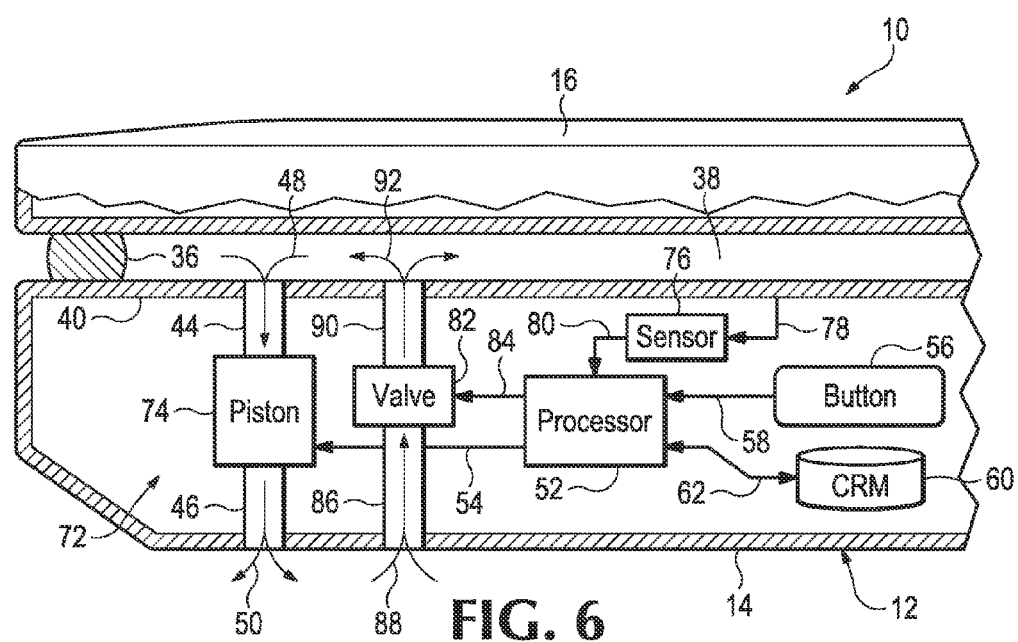

VACUUM LATCH ASSEMBLY

BACKGROUND

Consumers appreciate ease of use and reliability in electronic devices. Furthermore, businesses may desire to enhance the performance of electronic devices, for example, by increasing the robustness, durability, and/or life-span of such electronic devices. Business may, therefore, endeavor to design electronic devices directed toward one or more of these objectives.

BRIEF DESCRIPTION OF THE DRAWINGS

The following detailed description references the drawings, wherein:

FIG. 2 is a side view of the example of an electronic device of FIG. 1.

FIG. 3 is another side view of the example of the electronic device of FIG. 1.

FIG. 4 is an example of a vacuum latch assembly.

FIG. 5 is another example of a vacuum latch assembly.

FIG. 6 is a further example of a vacuum latch assembly.

DETAILED DESCRIPTION

Figure 1:
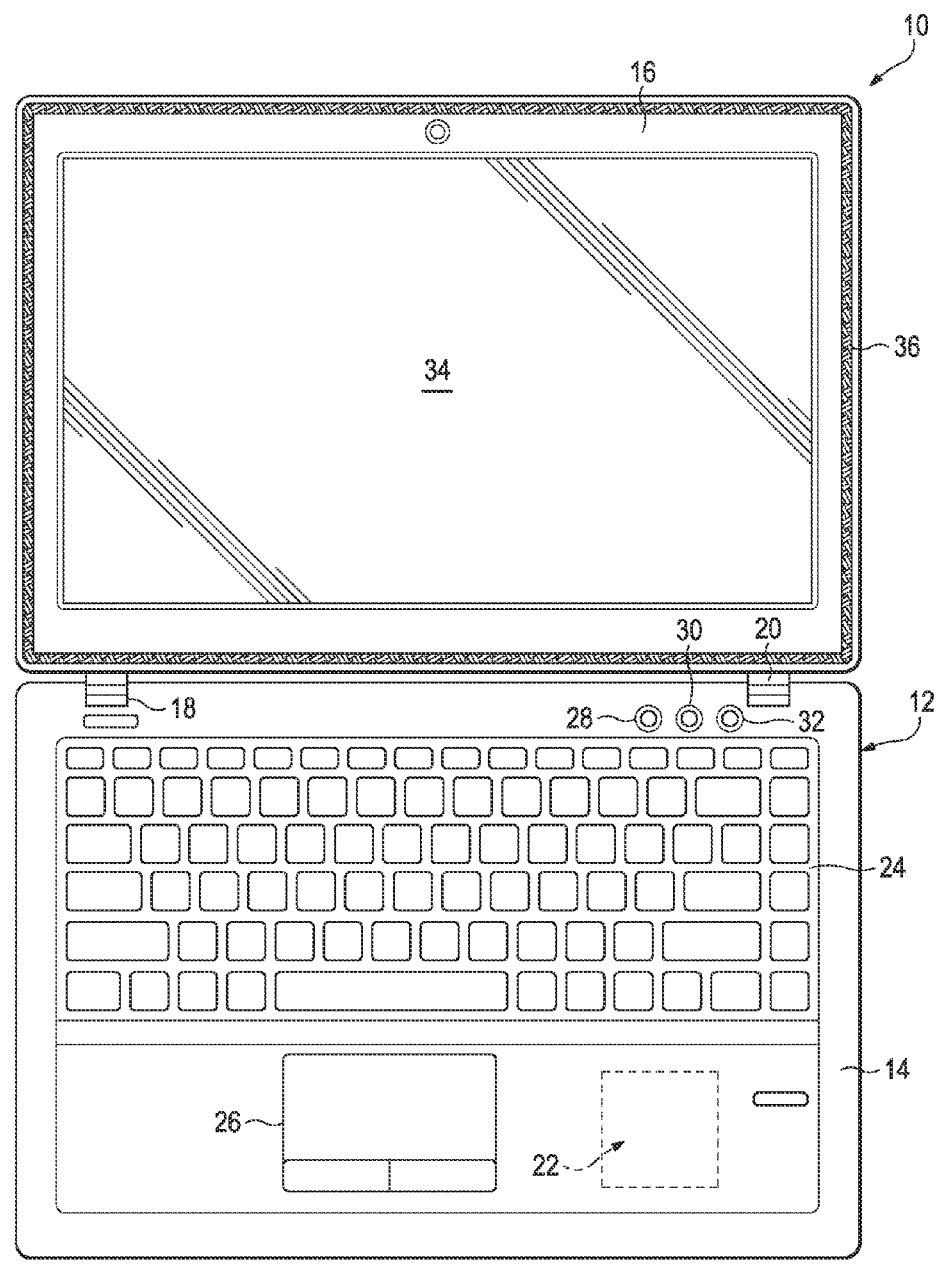
FIG. 1 is an example of an electronic device.

Electronic devices such as computers and mobile phones are ubiquitous. Some of these devices include a lid or cover that is part of the device (e.g., a laptop computer screen). For other electronic devices a case, cover or lid may be sold as an accessory. These lids and covers are intended, in part, to keep dirt and debris away from electrical and mechanical components of such electronic devices. However, such covers or lids inevitably allow some dirt and debris to enter through gaps between lid or cover and the rest of the housing of these devices. Moisture in the form of liquids and humidity may also enter through such gaps which can render an electronic device inoperable.

Another issue with such covers and lids is that they may inadvertently open. To address this issue, some electronic devices include one or more latches to secure the lid or cover in place. However, at least some of these latches may release or come undone, for example during transport due to an inadvertent bump or jar, which can result in the same inadvertent opening such latches are intended to prevent. To address this issue, some latches require significant force to open. However, this can also prove problematic for some users who lack sufficient strength and/or dexterity to open such latches.

An example of a vacuum latch assembly for an electronic device 10 directed at addressing at least some of these issues is shown in FIG. 1. As used herein, "vacuum" is defined as, but not necessarily limited to, being generally or substantially fluid-tight. An "elastically deformable member" is defined herein as including, but not necessarily being limited to, silicone, rubber, plastic, elastomer, or any combination thereof.

As used herein, "seal" is defined as including, but not necessarily being limited to, a member designed to be substantially air and/or water tight in compression between two members or items. "Electronic device" is defined as including, but not necessarily limited to, a computer, mobile phone, personal digital assistant (PDA), tablet, telephone, radio, mobile music player, or camera. "Fluid" is defined as including, but not necessarily being limited to, air or other gas and liquid or moisture.

As used herein, the terms "non-transitory storage medium" and non-transitory computer-readable storage medium" are defined as including, but not necessarily being limited to, any media that can contain, store, or maintain programs, information, and data. Non-transitory storage medium and non-transitory computer-readable storage medium may include any one of many physical media such as, for example, electronic, magnetic, optical, electromagnetic, or semiconductor media. More specific examples of suitable non-transitory storage medium and non-transitory computer-readable storage medium include, but are not limited to, a magnetic computer diskette such as floppy diskettes or hard drives, magnetic tape, a random access memory (RAM), a read-only memory (ROM), an erasable programmable read-only memory (EPROM), a flash drive, a compact disc (CD), or a digital video disk (DVD).

As used herein, the term "processor" is defined as including, but not necessarily being limited to, an instruction execution system such as a computer/processor based system, an Application Specific Integrated Circuit (ASIC), or a hardware and/or software system that can fetch or obtain the logic from a non-transitory storage medium or a non-transitory computer-readable storage medium and execute the instructions contained therein. "Processor" can also include any controller, state-machine, microprocessor, cloud-based utility, service or feature, or any other analogue, digital and/or mechanical implementation thereof.

As can be seen in the example shown in FIG. 1, electronic device 10 is a laptop computer 12 that includes a housing or first member 14 and a lid or second member 16 joined to housing 14 via hinges 18 and 20. Electronic device 10 additionally includes a vacuum latch assembly 22 designed to exhaust air within an enclosed space to create a substantially fluid-tight environment within the enclosed space and to help retain lid 16 in a closed position, as more fully discussed below.

As can also been seen in FIG. 1, laptop computer 12 includes many of the typical components found in such electronic devices, including a keyboard 24, a track pad 26 and several buttons 28, 30, and 32 that provide various functionality such as turning power on and off. Laptop computer 12 additionally includes a screen 34 coupled to lid 16 and surrounded by an elastically deformable member or seal 36, as shown.

An example of a side view of electronic device 10 is shown in FIG. 2. As can be seen in FIG. 2, lid 16 of laptop computer 12 is in a closed position. As can also be seen in FIG. 2, elastically deformable member 36 is positioned adjacent first member 14 and second member 16 in this closed position to define an enclosed space 38 (see, e.g., FIG. 4), as discussed in more detail below.

Another example of a side view of electronic device 10 is shown in FIG. 3. As can be seen in FIG. 3, lid 16 is movable via hinges 18 and 20 between the closed position shown in FIG. 2 and the open position shown in FIG. 3. The open position allows access to and use of for example, keyboard, 24 and track pad 26 of laptop computer 12, as well as viewing of screen 34.

An example of vacuum latch assembly 22 is shown in FIG. 4. As can be seen in FIG. 4, vacuum latch assembly 22 is disposed or positioned within interior or cavity 40 defined by housing 14. Vacuum latch assembly 22 includes a device to exhaust or evacuate air in enclosed space 38 via opening or port 44 defined by housing or first member 14 and in fluid communication therewith to the ambient environment via opening or port 46, also defined by housing or first member 14, as generally indicated by respective arrows 48 and 50.

This evacuation compresses housing 14 and lid 16 against seal or elastically deformable member 36 to create a substantially fluid-tight environment within enclosed space 38. It also helps to retain or secure lid 16 in the closed position. In the example shown in FIG. 4, device 42 includes a vacuum pump that receives power from electronic device 10 or includes its own power via other means, such as a battery (not shown).

Vacuum latch assembly 22 also includes a processor 52 coupled to device 42, as indicated by arrow 54, and a switch 56 (in this example a button) coupled to processor 52, as indicated by arrow 58. Vacuum latch assembly 22 additionally includes a non-transitory computer-readable storage medium 60 coupled to processor 52, as indicated by double-headed arrow 62, and including instructions that, when executed by processor 52, cause processor 52 to activate device or vacuum pump 42 upon actuation of switch or button 56.

Device 42 of vacuum latch assembly 22 may include a sensor or other means (not shown) that monitors pressure within enclosed space 38. In such cases, non-volatile computer-readable storage medium 60 includes additional instructions that, when executed by processor 52, cause processor 52 to deactivate device 42 at a predetermined pressure within enclosed space 38 as monitored by vacuum pump 42 and communicated back to processor 52, as indicated by arrow 64. In other examples of vacuum latch assembly 22, device 42 may automatically turn-off after a predetermined period of time that has been calculated to provide sufficient evacuation of air within enclosed space 38.

In this example shown in FIG. 4, non-volatile computer-readable storage medium 60 includes additionally instructions that, when executed by processor 52, cause processor 52 to unlatch or unlock lid 16 from the closed position upon a second pressing or actuation of switch or button 56. This allows lid 16 to be moved to the open position, as shown above in FIG. 3. Vacuum latch assembly 22 accomplishes this by activating device or vacuum pump 42 to conduct air from the ambient environment into port or opening 46, in a direction generally opposite that illustrated by arrow 50, into enclosed space 38 via opening or port 44, in a direction generally opposite that illustrated by arrow 48. This continues until the pressure within enclosed space 38 is raised to a predetermined sufficient level calculated such that users of device 10 will be able to open lid 16. This may be measured by device 42, as described above, or vacuum pump 42 may be designed to automatically turn-off after a predetermined period of time that has been calculated to provide sufficient flow of air into enclosed space 38.

Another example of a vacuum latch assembly 66 is shown in FIG. 5. Where possible, the same reference numerals are used for those components of vacuum latch assembly 66 that are substantially the same as those of vacuum latch assembly 22. As can be seen in FIG. 5, vacuum latch assembly 66 is disposed or positioned within interior or cavity 40 defined by housing 14. Vacuum latch assembly 66 includes a device 68 to exhaust or evacuate air in enclosed space 38 via opening or port 44 defined by housing or first member 14 and in fluid communication therewith to the ambient environment via opening or port 46, also defined by housing or first member 14, as generally indicated by respective arrows 48 and 50. This evacuation compresses housing 14 and lid 16 against seal or elastically deformable member 36 to create a substantially fluid-tight environment within enclosed space 38. It also helps to retain or secure lid 16 in the closed position. In the example shown in FIG. 5, device 66 includes a compressor that receives power from electronic device 10 or includes its own power via other means, such as a battery (not shown).

Vacuum latch assembly 66 also includes a processor 52 coupled to device 42, as indicated by arrow 54, and a switch 56 (in this example a button) coupled to processor 52, as indicated by arrow 58. Vacuum latch assembly 66 additionally includes a non-transitory computer-readable storage medium 60 coupled to processor 52, as indicated by double-headed arrow 62, and including instructions that, when executed by processor 52, cause processor 52 to activate device or compressor 68 upon actuation of switch or button 56.

Device 68 of vacuum latch assembly 66 may include a sensor or other means (not shown) that monitors pressure within enclosed space 38. In such cases, non-volatile computer-readable storage medium 60 includes additional instructions that, when executed by processor 52, cause processor 52 to deactivate device 68 at a predetermined pressure within enclosed space 38 as monitored by compressor 68 and communicated back to processor 52, as indicated by arrow 70. In other examples of vacuum latch assembly 66, device 68 may automatically turn-off after a predetermined period of time that has been calculated to provide sufficient evacuation of air within enclosed space 38.

In this example shown in FIG. 5, non-volatile computer-readable storage medium 60 includes additionally instructions that, when executed by processor 52, cause processor 52 to unlatch or unlock lid 16 from the closed position upon a second pressing or actuation of switch or button 56. This allows lid 16 to be moved to the open position, as shown above in FIG. 3. Vacuum latch assembly 66 accomplishes this by activating device or compressor 68 to conduct air from the ambient environment into port or opening 46, in a direction generally opposite that illustrated by arrow 50, into enclosed space 38 via opening or port 44, in a direction generally opposite that illustrated by arrow 48. This continues until the pressure within enclosed space 38 is raised to a predetermined sufficient level calculated such that users of device 10 will be able to open lid 16. This may be measured by device 66, as described above, or compressor 66 may be designed to automatically turn-off after a predetermined period of time that has been calculated to provide sufficient flow of air into enclosed space 38.

A further example of a vacuum latch assembly 72 is shown in FIG. 6. Where possible, the same reference numerals are used for those components of vacuum latch assembly 66 that are substantially the same as those of vacuum latch assembly 22 and vacuum latch assembly 66. As can be seen in FIG. 6, vacuum latch assembly 72 is disposed or positioned within interior or cavity 40 defined by housing 14. Vacuum latch assembly 72 includes a device 74 to exhaust or evacuate air in enclosed space 38 via opening or port 44 defined by housing or first member 14 and in fluid communication therewith to the ambient environment via opening or port 46, also defined by housing or first member 14, as generally indicated by respective arrows 48 and 50. This evacuation compresses housing 14 and lid 16 against seal or elastically deformable member 36 to create a substantially fluid-tight environment within enclosed space 38. It also helps to retain or secure lid 16 in the closed position. In the example shown in FIG. 6, device 74 includes a piston that receives power from electronic device 10 or includes its own power via other means, such as a battery (not shown).

Vacuum latch assembly 72 also includes a processor 52 coupled to device 42, as indicated by arrow 54, and a switch 56 (in this example a button) coupled to processor 52, as indicated by arrow 58. Vacuum latch assembly 72 additionally includes a non-transitory computer-readable storage medium 60 coupled to processor 52, as indicated by double-headed arrow 62, and including instructions that, when executed by processor 52, cause processor 52 to activate device or piston 74 upon actuation of switch or button 56.

Vacuum latch assembly 72 may additionally include a sensor 76 that monitors pressure within enclosed space 38, as indicated by arrow 78, and transmits or otherwise conveys this data to processor 52, as indicated by arrow 80. Non-volatile computer-readable storage medium 60 includes additional instructions that, when executed by processor 52, cause processor 52 to deactivate device 74 at a predetermined pressure within enclosed space 38 as monitored by sensor 76 and communicated back to processor 52, as indicated by arrow 70. In other examples of vacuum latch assembly 72, device 74 may automatically turn-off after a predetermined period of time that has been calculated to provide sufficient evacuation of air within enclosed space 38.

In this example shown in FIG. 6, non-volatile computer-readable storage medium 60 includes additionally instructions that, when executed by processor 52, cause processor 52 to unlatch or unlock lid 16 from the closed position upon a second pressing or actuation of switch or button 56. This allows lid 16 to be moved to the open position, as shown above in FIG. 3. Vacuum latch assembly 72 accomplishes this by causing processor 52 to open valve 82 (which is normally closed) to which it is connected, as indicated by arrow 84, to conduct air from the ambient environment into port or opening 86, in a direction illustrated by arrow 88, into enclosed space 38 via opening or port 90, in a direction illustrated by arrow 92. This continues until the pressure within enclosed space 38 is raised to a predetermined sufficient level calculated such that users of device 10 will be able to open lid 16. At this point, non-volatile computer-readable medium may include instructions that, when executed by processor 52, cause processor 52 to close valve 82. This point is measured by sensor 76, as described above. In other examples, non-volatile computer-readable storage medium 60 may include instructions that, when executed by processor 52, cause processor 52 to close valve 82 after a predetermined period of time that has been calculated to provide sufficient flow of air into enclosed space 38.

Although several examples have been described and illustrated in detail, it is to be clearly understood that the same are intended by way of illustration and example only. These examples are not intended to be exhaustive or to limit the invention to the precise form or to the exemplary embodiments disclosed. Modifications and variations may well be apparent to those of ordinary skill in the art. For example, all or a portion of vacuum latch assembly may be positioned elsewhere than within an interior defined by a housing of an electronic device (e.g., an interior defined by a lid of the electronic device). The spirit and scope of the present invention are to be limited only by the terms of the following claims.

Additionally, reference to an element in the singular is not intended to mean one and only one, unless explicitly so stated, but rather means one or more. Moreover, no element or component is intended to be dedicated to the public regardless of whether the element or component is explicitly recited in the following claims.

What is claimed is:

1. An electronic device, comprising:
   a housing;
   a lid joined to the housing and movable between a closed position adjacent the housing to define an enclosed space and an open position; and
   a vacuum latch assembly to exhaust air in the enclosed space to create a substantially fluid-tight environment within the enclosed space and to help retain the lid in the closed position.

2. The electronic device of claim 1, wherein the vacuum latch assembly secures the lid in the closed position.

3. The electronic device of claim 1, wherein the vacuum latch assembly includes a seal adjacent the housing and the lid in the closed position.

4. The electronic device of claim 1, wherein the vacuum latch assembly includes a device to exhaust air in the enclosed space.

5. The electronic device of claim 4, wherein the device includes one of a pump, a piston, a vacuum, and a compressor.

6. The electronic device of claim 4, wherein the vacuum latch assembly additionally includes:
   a processor coupled to the device;
   a switch coupled to the processor; and
   a non-transitory computer-readable storage medium including instructions that, when executed by the processor, cause the processor to activate the device upon actuation of the switch.

7. The electronic device of claim 6, wherein the vacuum latch assembly further includes:
   a sensor coupled to the processor to monitor a pressure within the enclosed space; and
   the non-transitory computer-readable storage medium including additional instructions that, when executed by the processor, cause the processor to deactivate the device at a predetermined pressure within the enclosed space as monitored by the sensor.

8. The electronic device of claim 1, further comprising a valve coupled to the enclosed space and an ambient environment, the valve having a closed position substantially preventing fluid flow between the enclosed space and the ambient environment and an open position permitting fluid flow between the enclosed space and the ambient environment.

9. The electronic device of claim 8, wherein the valve is coupled to the vacuum latch assembly.

10. The electronic device of claim 1, wherein the vacuum latch assembly is in the housing.

11. A vacuum latch assembly for use with an electronic device including a first member and a second member connected to the first member and movable between a closed position adjacent the first member and an open position, the vacuum latch comprising:
    an elastically deformable member adjacent the first member and the second member in the closed position to define an enclosed space;
    a device to exhaust air in the enclosed space to compress the first and second members against the seal to create a substantially fluid-tight environment within the enclosed space;
    a processor coupled to the device;
    a switch coupled to the processor; and
    a non-transitory computer-readable storage medium including instructions that, when executed by the processor, cause the processor to activate the device upon actuation of the switch.

12. The vacuum latch assembly of claim 11, further comprising:
    a sensor coupled to the processor to monitor a pressure within the enclosed space; and
    the non-transitory computer-readable storage medium including additional instructions that, when executed by the processor, cause the processor to deactivate the device at a predetermined pressure within the enclosed space as monitored by the sensor.

13. The vacuum latch assembly of claim 11, further comprising a valve coupled to the enclosed space, an ambient environment, and the processor, the valve having a closed position substantially preventing fluid flow between the enclosed space and the ambient environment and an open position permitting fluid flow between the enclosed space and the ambient environment.

14. The vacuum latch assembly of claim 13, wherein the valve is coupled to the device.

15. The vacuum latch assembly of claim 13, further comprising the non-transistor computer-readable storage medium including additional instructions that, when executed by the processor, cause the processor to close the valve upon actuation of the switch and open the valve upon an additional actuation of the switch.

16. The vacuum latch assembly of claim 11, wherein the device includes one of a pump, a piston, a vacuum, and a compressor.

17. The vacuum latch assembly of claim 11, wherein the vacuum latch assembly is further designed to secure the lid in the closed position upon actuation of the switch.

\* \* \* \* \*

UNITED STATES PATENT AND TRADEMARK OFFICE
CERTIFICATE OF CORRECTION

| | | |
|---|---|---|
| PATENT NO. | : 8,488,314 B1 | |
| APPLICATION NO. | : 13/456099 | |
| DATED | : July 16, 2013 | |
| INVENTOR(S) | : Britt C Ashcraft et al. | |

It is certified that error appears in the above-identified patent and that said Letters Patent is hereby corrected as shown below:

In the Claims:

In column 7, line 13, in Claim 15, delete "non-transistor" and insert -- non-transitory --, therefor.

Signed and Sealed this
Twenty-fourth Day of September, 2013

Teresa Stanek Rea
*Deputy Director of the United States Patent and Trademark Office*